Patented Nov. 5, 1935

2,019,598

UNITED STATES PATENT OFFICE 2,019,598

PRODUCTION OF CELLULOSIC MATERIALS OR CELLULOSE

Henry Dreyfus, London, England

No Drawing. Application February 11, 1933, Serial No. 656,362. In Great Britain March 4, 1932

2 Claims. (Cl. 92—11)

This invention relates to the production of cellulose or cellulosic materials.

In the sulphite process it is usual to employ sulphite liquors containing high proportions of free sulphur dioxide, for instance liquors containing at least as much free $SO_2$ as combined $SO_2$. The use of such liquors offers great disadvantage in practice and yields pulps containing relatively high proportions of beta cellulose. Further, the high proportion of free $SO_2$ often leads to serious attack upon and loss of cellulose.

I have now found that these disadvantages can be largely eliminated and that cellulose or cellulosic materials containing a high alpha cellulose content can be produced in an especially satisfactory manner if the wood, straw, grass or other materials are heated or cooked with solutions of bisulphites containing restricted quantities of free sulphur dioxide or with solutions of bisulphites substantially free from sulphur dioxide. For the purposes of the invention I may employ liquors in which the ratio of free to combined $SO_2$ is less than 1:2, but it is preferable to employ liquors containing considerably less free $SO_2$ (e. g. liquors in which the ratio is between 1:50 and 1:10) whilst particular advantage is to be attained with the use of liquors which are substantially free from free $SO_2$.

For the purposes of the invention I may employ liquors containing any soluble bisulphites, for instance bisulphites of sodium, potassium, magnesium, calcium, and especially sodium bisulphite or potassium bisulphite. The bisulphites may be employed in any convenient concentration, such for instance as employed in the usual sulphite process, concentrations corresponding to between about 2% and 5 to 8% of combined $SO_2$ being particularly suitable.

The cooking may be performed at temperatures and pressures such as are commonly employed in the "sulphite" process. Advantageously, however, higher pressures, e. g. 10 to 20 atmospheres or even very high pressures such as 100 or more atmospheres may be employed, and for such purposes inert gases or vapours may be pumped under pressure into the digesters or vessels, or volatile liquids or other substances adapted to generate vapours or liquids under pressure may be added to the materials or otherwise introduced into the digesters or vessels. The use of higher pressures accelerates the attack of the liquors on the encrusting substances and permits the employment of lower temperatures.

Temperatures below about 160° C., e. g. 135 to 150° C., are usually very suitable. With the higher pressures somewhat lower temperatures, e. g. below about 120° C., may be employed. It is, however, understood that I in nowise limit myself as to the temperatures or pressures to be employed in the process. Heating during the pulping operation may be performed by any convenient means, as for instance by direct or indirect heating with high pressure steam.

The time of treatment may vary considerably with the concentration of the bisulphite and the temperature and conditions employed and the nature of product it is desired to produce. The higher the concentration of the bisulphite and the higher the temperature, the more rapid is the action of the pulping liquor. Generally the time necessary for complete or substantially complete action is between about 6 and 24 hours. Thus, with high temperatures of about 140 to 150° C. and high concentrations of bisulphite (e. g. about 6 to 8% combined $SO_2$) substantially complete action may be secured in about 6 to 8 hours, especially when high or relatively high pressures such as over 6 to 8 atmospheres are employed; whilst with somewhat lower concentrations and lower temperatures, e. g. with 3–4% combined $SO_2$ and temperatures between about 110 and 130° C., a period of between about 16 and 24 hours is usually necessary for complete action, especially when only moderately elevated pressures such as about 3 to 4 atmospheres are employed.

The materials may, of course, be mixed or impregnated with the bisulphite solutions in any convenient way prior to the cooking process. Preferably, however, the materials are impregnated as thoroughly as possible with the solutions under pressure. If desired, the impregnation may be facilitated by incorporating wetting out agents, and especially Turkey red oil and the like in the solutions.

If desired, the impregnation can be effected at raised temperatures, especially temperatures between about 50 and 100° C., in which case the action of the bisulphites is usually greatly accelerated, it being even possible to obtain substantially complete action by a cooking operation lasting for so short a time as about 1 to 5 hours.

The process of the invention enables cellulose to be obtained in a very high state of purity. Further, by means of the invention destruction and loss of cellulose by attack of free $SO_2$ (or acids resulting from its use) can be largely or entirely avoided.

The following example illustrates the invention, but is not to be taken as limiting it in any way.

Example

Spruce chips are introduced into a digester, and a 6% aqueous solution of alkali bisulphite comprising about 0.2% free sulphur dioxide is run in; the vessel is then closed, and the contents heated to a temperature of 140° C. and the pressure raised to about 10 atmospheres by forcing nitrogen into the digester. The heating is continued for about 8 hours, after which the contents of the digester are allowed to cool, and the cellulose separated.

What I claim and desire to secure by Letters Patent is:—

1. Process for the manufacture of cellulosic products from lignified cellulosic materials which comprises effecting the separation of the cellulose and the lignin components by impregnating the cellulosic materials under pressure with an aqueous solution comprising metallic bisulphites, Turkey red oil, and free sulphur dioxide, in which solution the proportion of free sulphur dioxide to combined sulphur dioxide is less than 1:2 and then cooking the said impregnated material and the solution at a temperature between 100° and 160° C.

2. Process for the manufacture of cellulosic products from lignified cellulosic materials which comprises effecting the separation of the cellulose and the lignin components by impregnating the cellulosic materials under pressure with an aqueous solution comprising metallic bisulphites, Turkey red oil, and free sulphur dioxide, in which solution the proportion of free sulphur dioxide to combined sulphur dioxide is less than 1:10 and then cooking the said impregnated material and the solution at a temperature between 100° and 160° C. and under a pressure between 10 and 100 atmospheres.

HENRY DREYFUS.